(12) United States Patent
Ohmori

(10) Patent No.: US 7,082,029 B2
(45) Date of Patent: Jul. 25, 2006

(54) ELECTRONIC APPARATUS COMPRISING CARD RECEPTACLES IN WHICH PC CARDS ARE RECEIVED

(75) Inventor: Mikio Ohmori, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/743,001

(22) Filed: Dec. 23, 2003

(65) Prior Publication Data

US 2004/0136158 A1    Jul. 15, 2004

(30) Foreign Application Priority Data

Dec. 25, 2002    (JP)    ............................. 2002-374517

(51) Int. Cl.
*G06F 1/16* (2006.01)
(52) U.S. Cl. ...................... 361/684; 439/631
(58) Field of Classification Search ........ 361/683–686, 361/247, 726, 727, 735, 737, 740, 801; 439/928.1, 439/631; 360/97.03, 98.01, 137
See application file for complete search history.

(56) References Cited

U.S. PATENT DOCUMENTS

| | | | | |
|---|---|---|---|---|
| 5,608,606 A | * | 3/1997 | Blaney | ........................ 361/686 |
| 5,649,121 A | * | 7/1997 | Budman et al. | ............. 710/301 |
| 5,793,607 A | | 8/1998 | Karidis et al. | |
| 6,002,605 A | * | 12/1999 | Iwasaki et al. | ................. 365/51 |
| 6,016,954 A | * | 1/2000 | Abe et al. | ..................... 235/379 |
| 6,189,786 B1 | * | 2/2001 | Itou et al. | ..................... 235/379 |
| 6,250,965 B1 | * | 6/2001 | Neifer | ......................... 439/630 |
| 6,319,035 B1 | * | 11/2001 | Choy | .......................... 439/326 |
| 6,345,988 B1 | * | 2/2002 | Ketcham | ....................... 439/74 |
| 6,370,608 B1 | * | 4/2002 | Yamada et al. | ............. 710/301 |
| 6,491,226 B1 | * | 12/2002 | Nishioka | ...................... 235/475 |
| 6,651,881 B1 | * | 11/2003 | Choiset | ........................ 235/380 |
| 2002/0034966 A1 | * | 3/2002 | Saito et al. | ................... 455/558 |

FOREIGN PATENT DOCUMENTS

| | | |
|---|---|---|
| JP | 5-11886 | 1/1993 |
| JP | 7-281788 | 10/1995 |
| JP | 10-302030 | 11/1998 |
| JP | 11-167428 | 6/1999 |
| JP | 2002-366902 | 12/2002 |

* cited by examiner

*Primary Examiner*—Lynn Feild
*Assistant Examiner*—Anthony Q. Edwards
(74) *Attorney, Agent, or Firm*—Finnegan, Henderson, Farabow, Garrett & Dunner, L.L.P.

(57) ABSTRACT

An electronic apparatus includes a main body, and a plurality of card receptacles provided inside the main body. Cards having projections at one end are inserted into the card receptacles. The card receptacles overlap each other in the thickness direction of the cards and are shifted in the direction in which the cards are inserted.

19 Claims, 4 Drawing Sheets

ELECTRONIC APPARATUS COMPRISING CARD RECEPTACLES IN WHICH PC CARDS ARE RECEIVED

CROSS REFERENCE TO RELATED APPLICATIONS

This application is based upon and claims the benefit of priority from the prior Japanese Patent Application No. 2002-374517, filed Dec. 25, 2002, the entire contents of which are incorporated herein by reference.

BACKGROUND OF THE INVENTION

1. Field of the Invention

The present invention relates to an electronic apparatus that has a plurality of card receptacles in which PC cards for wireless communications are received.

2. Description of the Related Art

An electronic apparatus, such as a portable computer and a server used for the management of a large amount of data, comprises a plurality of card receptacles in which PC cards that conforms to the specifications determined by the PCM-CIA (Personal Computer Memory Card International Association) are received.

The card receptacles are provided inside the housing of the electronic apparatus and are stacked in the thickness direction of that housing, as in the apparatus shown in Jpn. Pat. Appln. KOKAI Publication No. 11-167428. The card receptacles comprise card slots through which PC cards are inserted or removed. The card slots are open in a peripheral surface of the housing. Where a plurality of PC cards are connected to the electronic apparatus, they are inserted into the card receptacles in parallel to one another and face one another.

In recent years, more and more wireless LANs use broadband technology, and wireless communications devices have become low in price. As a result of these, environments for short-distance wireless communications are now in place. Under the circumstances, PC cards having the communications function are provided for a plurality of electronic apparatuses, so as to connect them through a wireless LAN.

A PC card for wireless communications comprises: a card main body containing a wireless interface circuit; and an antenna section containing an antenna element. The antenna section is located at one end of the card main body and is outside the housing when it is inserted into the card receptacle through the card slot. With this structure, the antenna section is not surrounded by any object that would have negative effects on radiation field. In other words, the antenna section can be viewed from any position outside the housing.

The antenna section of the PC card is thicker than the card main body. If the wireless-communications PC card provided with the antenna section is inserted into a lower card receptacle, the antenna section is inevitably located in the card slot of the upper card receptacle. In this case, another PC card cannot be inserted into the upper card receptacle because the antenna section of the PC card inserted in the lower card receptacle becomes an obstacle. In other words, PC cards cannot be inserted to all of the card receptacles.

To solve the problem described above, it may be thought to increase the intervals between the card receptacles. However, since the card receptacles are stacked in the thickness direction of the housing, an increase in the intervals between the card receptacles inevitably results in an increase in the thickness of the housing. This becomes a bard to the recent trend of providing thin electronic apparatuses.

Where two PC cards for wireless communications are parallel to each other, their antenna sections inevitably overlap each other. As a result, the electric fields the antenna sections emit radially interfere with each other, resulting in poor wireless performance.

BRIEF SUMMARY OF THE INVENTION

According to an embodiment of the present invention, there is provided an electronic apparatus comprises: a main body; and a plurality of card receptacles provided inside the main body and enabling removable insertion of cards that have projections at one end. The card receptacles overlap each other but are shifted in the card insertion direction.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the drawings.

Figure 1:
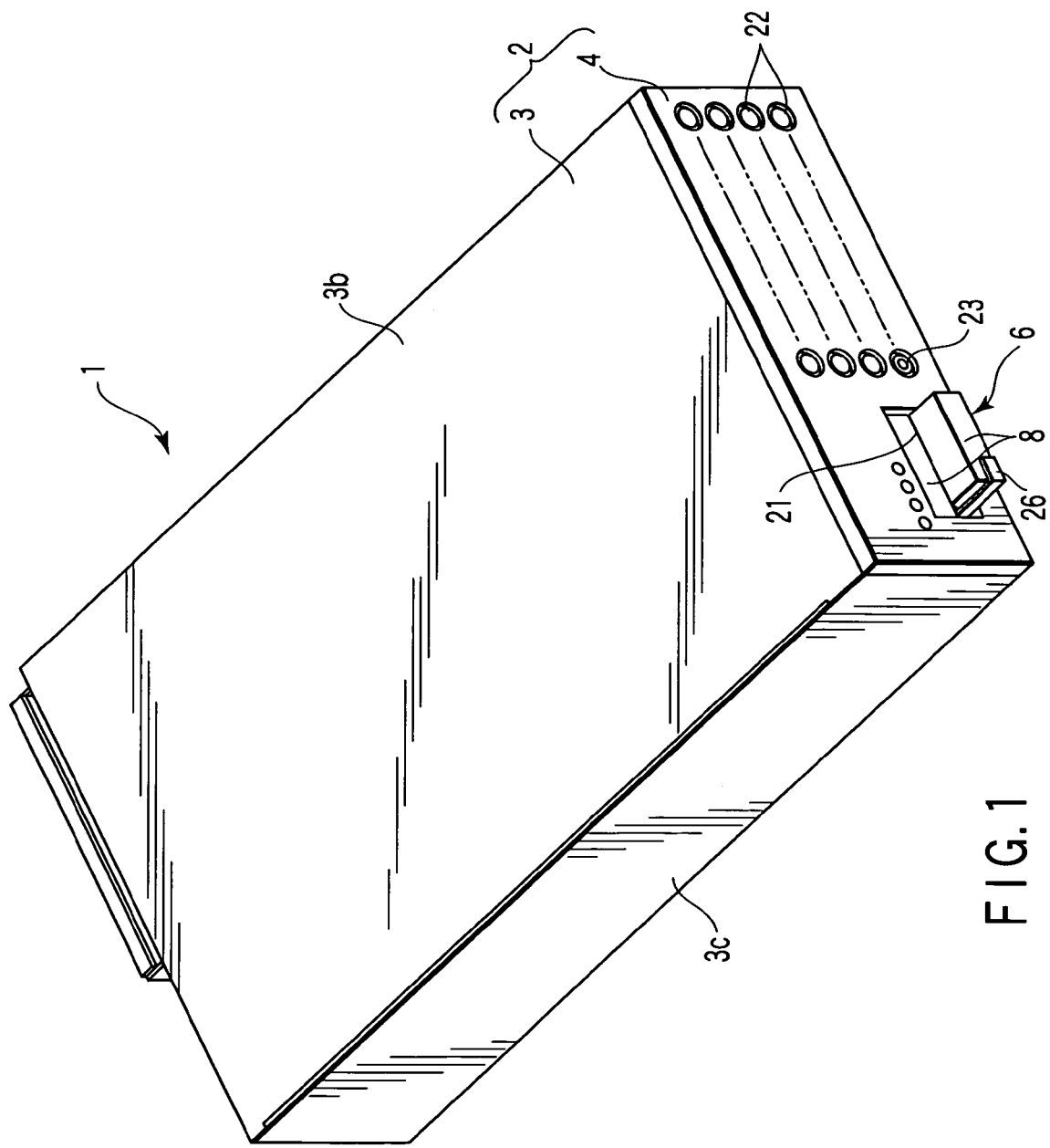
FIG. 1 is a perspective view of a server according to an embodiment of the present invention.
Figure 2:
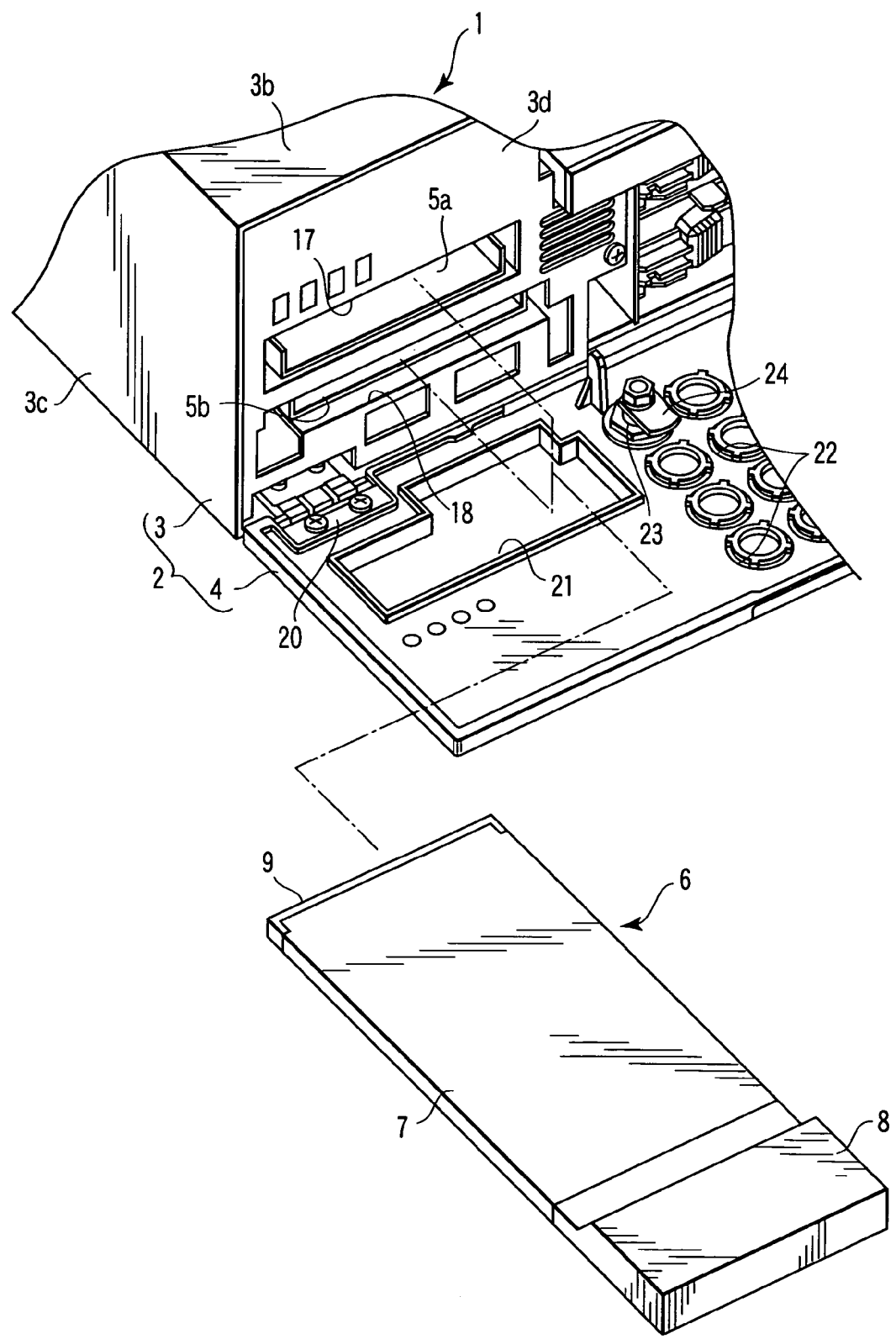
FIG. 2 is a perspective view of the server and illustrates a state where the door of the main body is rotated to the second position to expose first and second card slots.

FIGS. 1 and 2 show a server 1, which is one type of electronic apparatus. The server 1 has a main body 2 laid on a desk or a rack plate. The main body 2 includes a metallic housing 3 and a synthetic resin front door 4.

The housing 3 is a hollow box including a bottom plate 3a, a top plate 3b, and right and left side plates 3c, and a front plate 3d. The housing 3 contains major structural elements, including a printed circuit board on which a plurality of microprocessors are mounted, a plurality of hard disk drives, a power supply unit, a cooling unit, etc.

Figure 3:
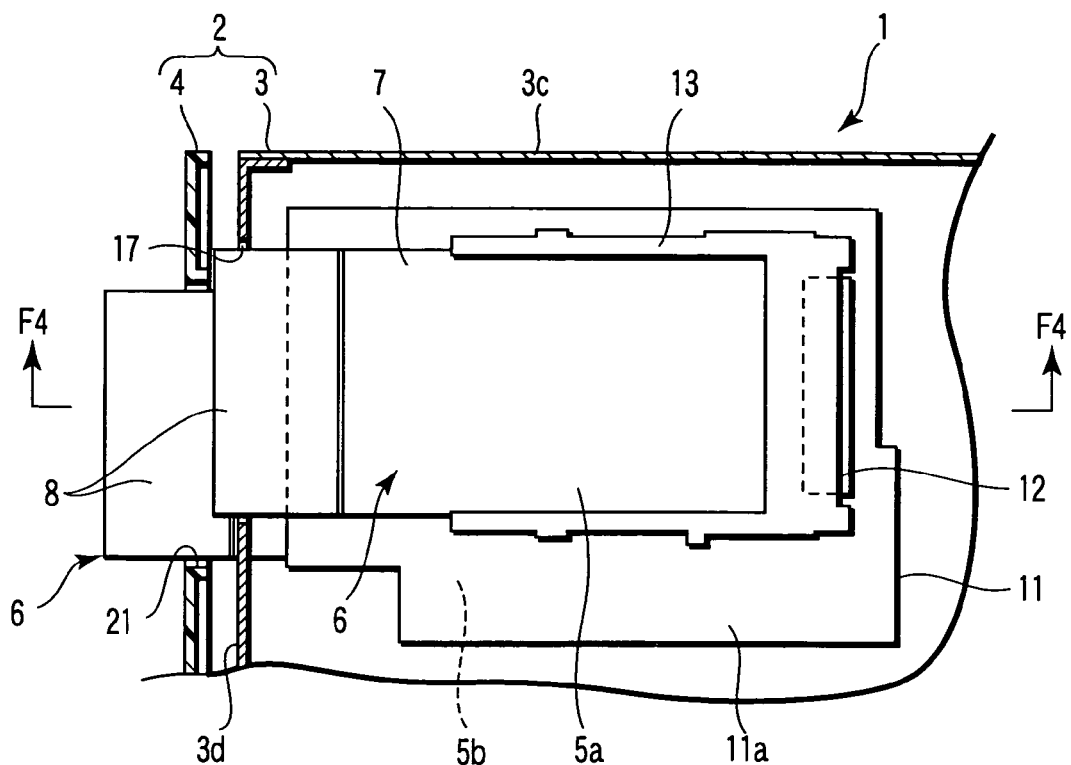
FIG. 3 is a sectional view of the server and illustrates a state where antenna-provided PC cards are inserted in first and second card receptacles.
Figure 4:
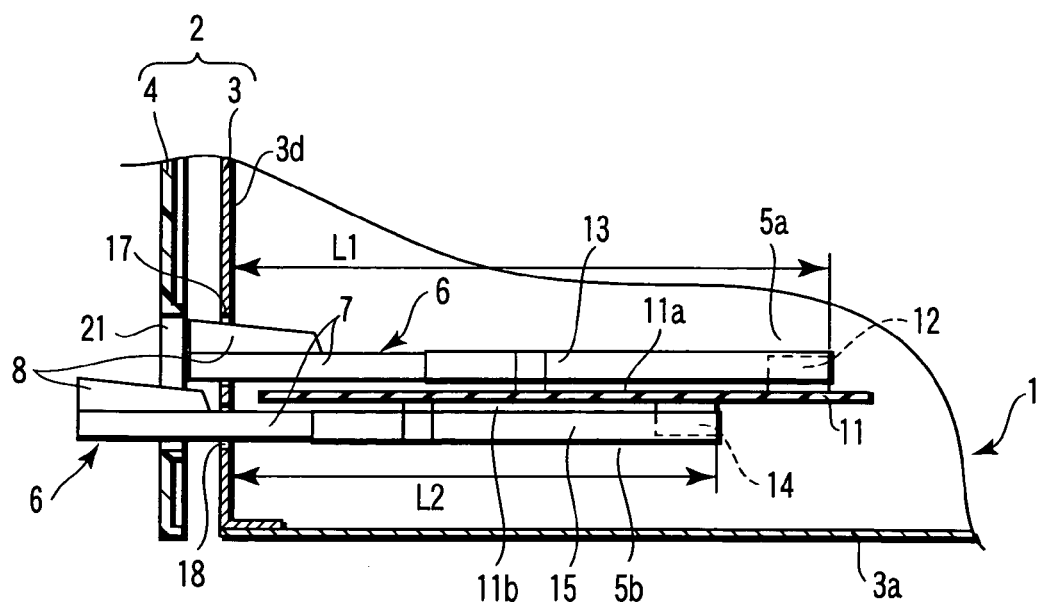
FIG. 4 is a sectional view taken along line F4—F4 of FIG. 3.

As shown in FIGS. 3 and 4, first and second card receptacles 5a and 5b are defined inside the housing 3. PC cards (wireless LAN cards) 6 having the communication function are removably inserted into the first and second receptacles 5a and 5b. As shown in FIG. 2, the PC card 6 is provided with a card main body 7 and an antenna section 8, which is a projected portion. The card main body 7 has size determined by the PCMCIA. The antenna section 8 is located at one end of the card main body 7 and contains an antenna element for wireless communications. The antenna section 8 is thicker than the card main body 7. The card main body 7 is provided with a connector 9 at the end opposite to that of the antenna section 8.

The first and second card receptacles 5a and 5b located in the front leftward region inside the housing 3 and laid one on the other in the thickness direction of the housing 3. A printed circuit board 11 is interposed between the first card receptacle 5a, which is the upper one, and the second card receptacle 5b, which is the lower one. The printed circuit board 11 is supported by the housing 3 and is parallel to the bottom plate 3a of the housing 3.

The printed circuit board 11 has an upper surface 11a and a lower surface 11b. The first surface 11a is exposed in the first card receptacle 5a; likewise, the second surface 11b is exposed in the second card receptacle 5b. A first card connector 12 and a first insertion guide 13 are provided on the upper surface 11a of the printed circuit board 11. The first insertion guide 13 serves to guide the PC card 6 to the first card connector 12. A second card connector 14 and a second insertion guide 15 are provided on the lower surface 11b of the printed circuit board 11. The second insertion guide 15 serves to guide the PC card 6 to the second card connector 14.

The first card receptacle 5a has a first card slot 17 through which the PC card 6 is inserted or removed. The first card slot 17 is formed in the front plate 3d of the housing 3 and is in the form of a slit extending in the widthwise direction of the PC card 6. The second card receptacle 5b has a second card slot 18 through which the PC card 6 is inserted or removed. The second card slot 18 is formed in the front plate 3d of the housing 3 and is in the form of a slit extending in the widthwise direction of the PC card 6. The first and second card slots 17 and 18 are opposed to the first and second card connectors 12 and 14, respectively.

The PC cards 6 are inserted through the first and second card slots 17 and 18 into the first and second card receptacles 5a and 5b, with the connectors 9 leading first. By this insertion, the connectors 9 are electrically connected to the card connectors 12 and 14. When the PC cards 6 have been inserted into the first and second card receptacles 5a and 5b, they are parallel to each other, with a predetermined distance kept between them.

Figure 5:
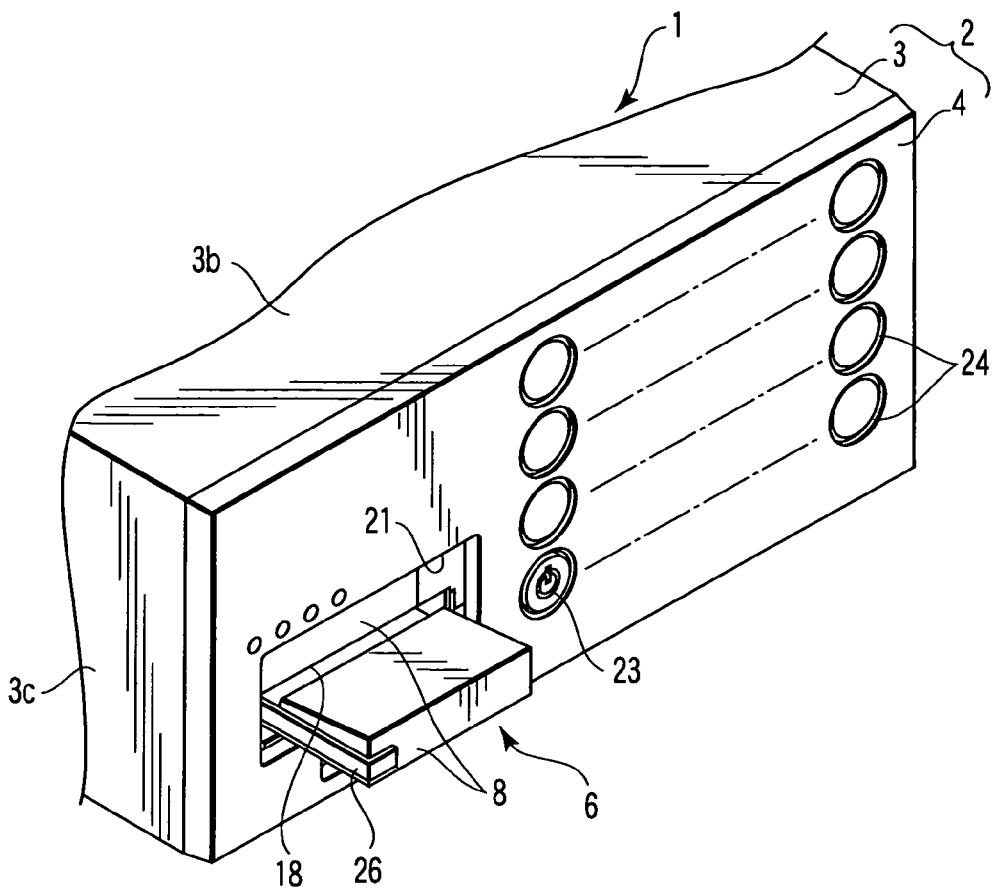
FIG. 5 is a perspective view of the server and illustrates a state where the antenna section of a PC card is projected out of the door.

The front door 4 of the main body 2 is made of a rectangular plate corresponding in size to the front plate 3d of the housing 3. The front door 4 is supported by the front end portion of the bottom plate 3a of the housing 3 by means of a hinge 20, and is rotatable between two positions, namely first and second positions. FIGS. 3 and 5 illustrate a state where the front door 4 is rotated to the first position. At the first position, the front door 4 is raised in such a manner as to cover the front plate 3d of the housing 3, and are opposed to the first and second card slots 17 and 18. At the second position, the front door 4 is laid in front of the housing 3 and is away from the first and second card slots 17 and 18.

The front door 4 has a card insertion port 21 and a plurality of air intake holes 22. When the front door 4 is moved to the first position, the card insertion port 21 communicates with the first and second card slots 17 and 18.

The front door 4 is provided with a lock cylinder 23 serving as a locking device. The lock cylinder 23 includes an engagement member 24 that can be brought into engagement with the front plate 3d of the housing 3. The engagement member 24 is moved between a lock position and an unlock position by means of a lock key (not shown). When the front door 4 is rotated to the first position, and the lock cylinder 23 is moved to the lock position, the engagement member 24 comes into engagement with the front plate 3d. As a result, the front door 4 is locked at the first position.

The engagement member 24 can be separated from the front plate 3d by moving the engagement member 24 of the lock cylinder 23 from the lock position to the unlock position when the front door 4 is locked at the first position. As a result, the front door 4 is unlocked, and can therefore be rotated from the first position to the second position.

As shown in FIGS. 3 and 4, the first card receptacle 5a and the second card receptacle 5b are shifted from each other in the card insertion direction. To be more specific, the first card connector 12 of the first card receptacle 5a is located more away from the front plate 3d than the second card connector 14 of the second card receptacle 5b. In other words, the depth dimension L1 of the first card receptacle 5a is greater than that L2 of the second card receptacle 5b.

In the state where the PC card 6 is inserted in the first card receptacle 5a (the upper receptacle), the antenna section 8 is located more inward of the housing 3 than the card insertion port 21 of the front door 4. In other words, the front end of the antenna section 8 is located between the front door 4 and the front panel 3d. In the state where the PC card 6 is inserted in the second card receptacle 5b (the lower receptacle), most of the antenna section 8 is projected out of the card insertion port 21 and located outside of the main body 2. Therefore, even when the PC cards 6 are inserted into the first and second card receptacles 5a and 5b, their antenna sections 8 do not overlap each other; they are shifted in the card insertion direction.

Figure 6:
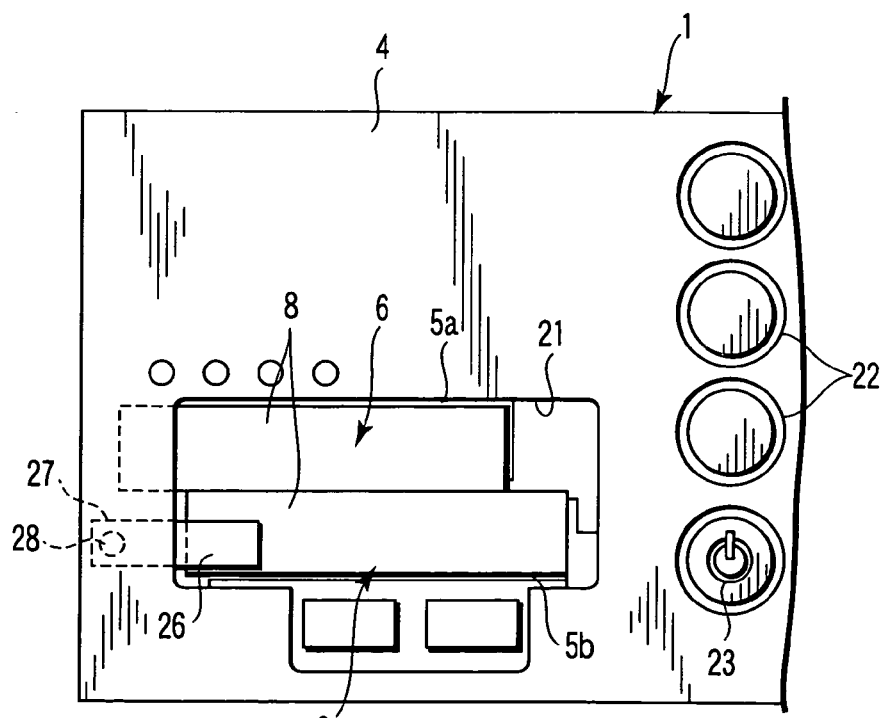
FIG. 6 is a front view of the server and illustrates the positional relationships between the antenna sections of PC cards and the door.

As shown in FIGS. 3 and 6, the first card receptacle 5a and the second card receptacle 5b are shifted from each other in the widthwise direction of the PC cards 6. To be more specific, the first card receptacle 5a (the upper receptacle) is shifted from the card insertion port 21 of the front door 4 in the widthwise direction of the PC cards 6. with this structure, when the front door 4 is rotated to the first position, one end of the first card slot 17 is out of the opening range of the card insertion port 21.

If the front door 4 is rotated to the first position, with the PC card 6 inserted in the first card receptacle 5a, the front door portion that is continuous with one end of the card insertion port 21 is opposed to the front end of the antenna section 8. Therefore, even if the PC card 6 inserted in the first card receptacle 5a is pulled out of the card insertion port 21, the front end of the antenna section 8 strikes against the front door 4. Hence, the front door 4 is useful in preventing the PC card 6 from being stolen by merely locking the front door 4 at the first position by means of the lock cylinder 23. In addition, since the first card receptacle 5a need not comprise a mechanism specially designed for preventing the PC card 6 from being stolen, the structure of the main body 2 can be simple.

The second card slot 18 of the second card receptacle 5b is located in the opening region of the card insertion port 21 even when the front door 4 is rotated to the first position. In other words, the PC card 6 can be easily inserted or removed from the second card receptacle 5b even when the front door 4 is located at the first position.

As can be understood from the above, the server 1 of the present embodiment is provided with a latch member 26 for preventing the PC card 6 inserted in the second card receptacle 5b from being stolen. As shown in FIGS. 1 and 5, the latch member 26 engages with the antenna section 8 of the PC card 6. The latch member 26 has a fixing portion 27. This fixing portion 27 is detachably fixed to the front plate 3d of the housing 3 by means of a screw 28. As long as the front door 4 is at the first position, the fixing portion 27 of the latch member 26 is covered with the front door 4.

When the front door 4 is locked at the first position, therefore, the latch member 26 cannot be pulled out of the housing 3. Hence, the latch member 26 is kept in the state where it engages with the PC card 6, and the PC card 6 is therefore prevented from being stolen.

In the server of the structure described above, the first and second card receptacles 5a and 5b inside the housing 3 are shifted from each other in the card insertion direction. In addition, the first and second card receptacles 5a and 5b have different depth dimensions L1 and L2. Therefore, in the state where PC cards 6 for wireless communications are inserted in the first and second card receptacles 5a and 5b, the antenna sections 8, which are thicker than the card main bodies, are shifted from each other in the card insertion direction.

Accordingly, the antenna sections 8 of the PC cards 6 are prevented from interfering with each other with no need to increase the intervals between the first and second card receptacles 5a and 5b. The main body 2 of the server 1 can be as thin and compact in size as possible.

Since the antenna sections 8 of the two PC cards 6 are shifted from each other, the electric fields they radiate do not much interfere with each other. As a result, reliable wireless performance can be obtained.

The electronic apparatus according to the present invention is not limited to a server and is applicable to a portable computer, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a main body including a housing;
   a plurality of card receptacles provided inside the main body and enabling removable insertion of cards that have projections at one end, the card receptacles overlapping each other in a thickness direction of the cards and being shifted in a card insertion direction; and
   a door supported by the housing, the door being rotatable between a first position in which the door is opposed to the card receptacles and a second position in which the door is located away from the card receptacles, the door being provided with a card insertion port in which the projection of a card is located when the door is rotated to the first position.

2. The electronic apparatus according to claim 1, wherein said card receptacles are stacked in a thickness direction of the main body.

3. The electronic apparatus according to claim 1, wherein the card receptacles are shifted to each other in a card insertion direction, each projection having a thickness greater than a thickness of each of the cards, and the projections of the cards are shifted to each other in the card insertion direction to be prevented from overlapping each other when the cards are inserted in the card receptacles.

4. The electronic apparatus according to claim 1, wherein each of the card receptacles comprises a card slot through which a card is inserted or removed, the card insertion port of the door communicating with the card slot, the projection of a card inserted in one of the card receptacles is located more inward of the main body than the card insertion port, and the projection of a card inserted in another one of the card receptacles is projected out of the card insertion port and located outside of the main body.

5. The electronic apparatus according to claim 1, wherein the card receptacles are shifted from each other in a widthwise direction of the cards.

6. The electronic apparatus according to claim 1, wherein one of the card receptacles is shifted from the card insertion port in a widthwise direction of the cards, and when the door is rotated to the first position, the door is opposed to the projection of the card inserted in said one of the card receptacles and thus prevents the card from being taken out of said one of the card receptacles.

7. The electronic apparatus according to claim 6, wherein said main body includes a locking device configured to lock the door at the first position.

8. The electronic apparatus according to claim 1, wherein each of the cards includes a card main body on which the projection is formed, and the projection is greater in thickness than the card main body.

9. The electronic apparatus according to claim 8, wherein the projections of the cards include an antenna section for wireless communications.

10. An electronic apparatus to which cards each having a wireless-communications antenna section at one end is connectable, comprising:
    a housing;
    a plurality of card receptacles provided inside the housing and enabling removable insertion of the cards, the card receptacles overlapping each other in a thickness direction of the cards and being shifted in a card insertion direction; and
    a door supported by the housing, the door being rotatable between a first position where the door is opposed to the card receptacles and a second position where the door is located away from the card receptacles, and the door being provided with a card insertion port in which the antenna section of the card is located when the door is rotated to the first position.

11. The electronic apparatus according to claim 10, further including a locking device configured to lock the door at the first position.

12. The electronic apparatus according to claim 10, wherein the antenna section is greater in thickness than the card.

13. The electronic apparatus according to claim 10, wherein a card inserted in one of the card receptacles has an antenna section located more inward of the housing than the card insertion port, and a card inserted in another one of the card receptacles has an antenna section projected out of the card insertion port and located outside of the housing.

14. The electronic apparatus according to claim 11, wherein one of the card receptacles is shifted from the card insertion port in a widthwise direction of the cards, and when the door is locked at the first position, the door is opposed to the antenna section of the card inserted in said one of the card receptacles and thus prevents the card from being take out of said one of the card receptacles.

15. An electronic apparatus comprising:
    a housing;
    first and second card receptacles provided inside the housing and having card slots into which cards are insertable, each of the cards including an antenna section for wireless communications at one end; and
    a door supported by the housing, the door being rotatable between a first position where the door is laid on the housing and a second position where the door is located away from the housing, and the door being provided with a card insertion port which communicates with the card slots when the door is rotated to the first position, wherein one of the first and second card receptacles is shifted from each other in both an insertion direction of the cards and a widthwise direction of the cards, and when the door is rotated to the first position, the door is opposed to the antenna section of a card inserted in the first card receptacle and thus prevents the card from being take out of the first card receptacle.

16. The electronic apparatus according to claim 15, wherein when the cards are inserted in the first and second card receptacles, respectively, and antenna sections of the cards are shifted from each other in the insertion direction of the cards without overlapping each other.

17. The electronic apparatus according to claim 15, further comprising:

a locking device configured to lock the door at the first position.

18. The electronic apparatus according to claim 17, wherein the card slot of the second card receptacle is located in an opening region of the card insertion port when the door is rotated to the first position.

19. The electronic apparatus according to claim 18, wherein the housing comprises a latch that is engageable with the antenna section of the card inserted in the second card receptacle, the latch includes a fixing portion detachably fixed to the housing, and the fixing portion is covered with the door as long as the door is rotated to the first position.

* * * * *